Figure 1:
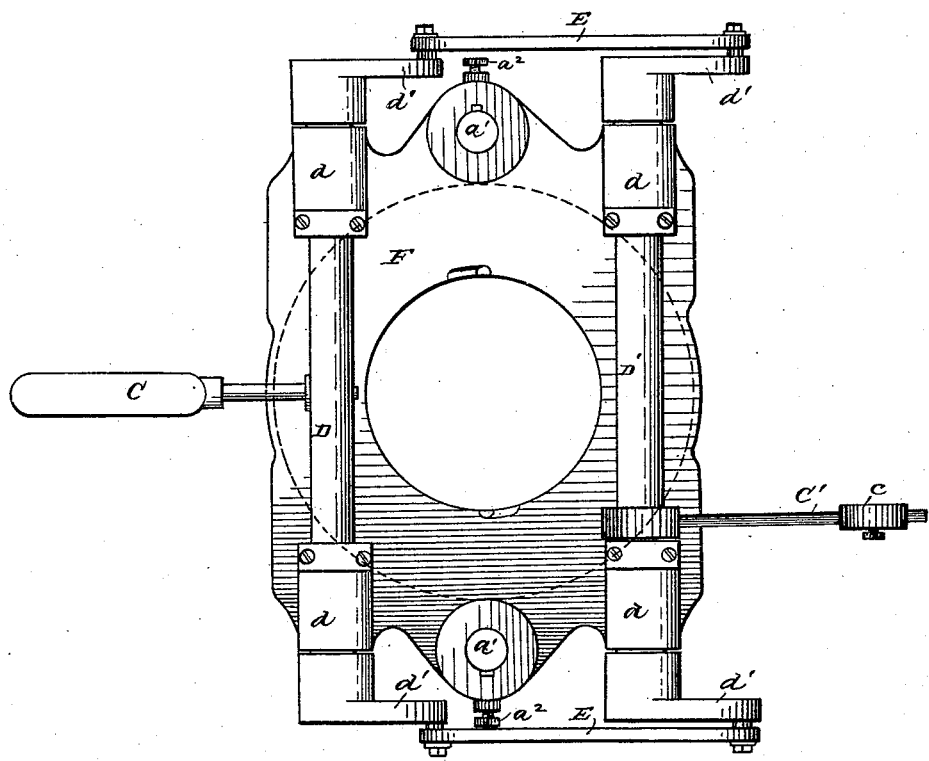

(No Model.) 2 Sheets—Sheet 1.

J. A. WIDMER.
GLASS PRESS.

No. 471,516. Patented Mar. 22, 1892.

Witnesses.
W. R. Edelen.
A. A. Edelen

Inventor.
Jacob A. Widmer
By O. D. Levis
Atty

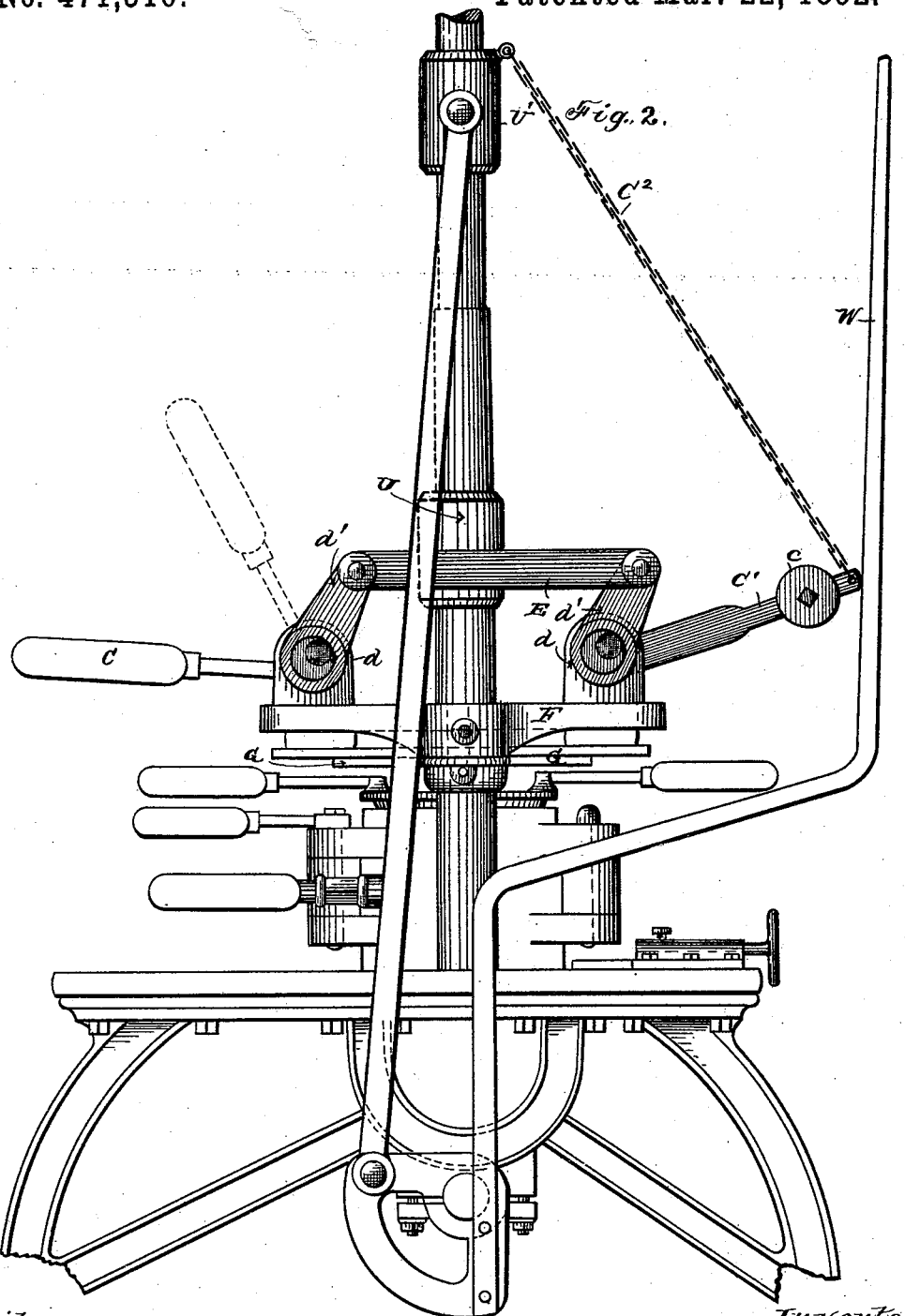

UNITED STATES PATENT OFFICE.

JACOB ADOLF WIDMER, OF PITTSBURG, PENNSYLVANIA, ASSIGNOR TO FRANK W. EVANS, HENRY RUHE, ADAM TRAUTMAN, EDUARD HAAS, AND J. A. WIDMER.

GLASS-PRESS.

SPECIFICATION forming part of Letters Patent No. 471,516, dated March 22, 1892.

Application filed April 13, 1891. Serial No. 388,762. (No model.)

*To all whom it may concern:*

Be it known that I, JACOB ADOLF WIDMER, a citizen of the United States, residing at Pittsburg, in the county of Allegheny and State of Pennsylvania, have invented certain new and useful Improvements in Glass-Presses; and I do hereby declare the following to be a full, clear, and exact description of the invention, such as will enable others skilled in the art to which it pertains to make and use the same, reference being had to the accompanying drawings, which form a part of this specification.

My invention relates to improvements in glass-presses and certain features of construction, which will be hereinafter described, and noted in the claims.

The glass-presses heretofore manufactured have been provided with four powerful spiral springs above the plunger which abut on a spring-plate, the object of said spring being to hold the ring surrounding the plunger-base rigidly upon the mold during the process of pressing. In order to accomplish this, it is necessary that the bottom spring-plate and the springs offer resistance and exert pressure upon the ring before the press-plunger comes in contact with the glass to be pressed in the mold. The operator when using the press is therefore compelled to use a vast amount of useless strength, or, I might say, double the strength necessary to overcome the resistance of the springs and pressure upon the glass. By using this abnormally great strength in overcoming the resistance of the springs, that fine feeling of sensitiveness is to a degree lost, which is absolutely necessary to ascertain by experience the condition of the glass under the plunger pressure by its increasing chill, perfect mold distribution, and mold-space fullness which offers increased resistance, as previously stated, on account of the spring-pressure and resistance to muscular sensitiveness, cannot be adjusted exactly alike in the manufacture of any two articles of different form, size, or weight. To overcome this difficulty, it is necessary to so alter and improve the construction of glass-presses that the resisting-springs above the plunger shall be entirely dispensed with by the introduction of an apparatus to be fastened upon both uprights or columns and which must work in unison one with the other and at the same time automatically hold down the ring and mold during the pressing process, so that the workman need only press the glass deposited into the mold, and thereby can readily ascertain by his experience and sensitive feeling the proper distribution of the glass under pressure.

In the drawings, Figure 1 is a plan of my improved device with the plunger and mold removed. Fig. 2 is a side elevation of my press both in full and partly in dotted lines.

The mold and its accompanying mechanism for operating the same is an old feature in this class of machines, and therefore need not be described in full, except that portion which is necessary to operate my improved device, which is secured to the same. The two guides are secured to the upright press-standards at $a'$ $a'$, and they are elevated into position by means of the press-lever W and properly adjusted and secured by set-screws $a^2$ $a^2$, (shown in Fig. 1 of the accompanying drawings.)

The eccentric-shafts D and D' are secured in suitable boxes $d$ $d$ $d$ $d$. Said shafts at their opposite ends are provided with cranks $d'$ $d'$, $d'$ $d'$ and links E E, connecting each pair of cranks, so as to impart a uniform movement when operated by means of handle C. Said handle C is serviceable only while adjusting the mold for working during the process of pressing. Said lever C fits loosely in the eccentric-shaft D and is removed as soon as the molds are adjusted. Lever C', which is rigidly secured to the eccentric-shaft D', is elevated by means of the movement imparted to the lever W and the cross-head U'. Said lever C' is provided with a weight $c$ for holding it steadily against the chain $C^2$, which is secured to cross-head U' and also to assist by gravity to depress said lever C'.

F is a frame which supports the improved mechanism for releasing the molds and is firmly secured to the press column or standard, as shown best in Fig. 2. Under said frame is a plate or mold ring G, which is firmly secured to the press columns or standards and is provided with lugs or their equivalent, movable vertically in slots formed in the frame F, which lugs connect with a horizontal slot or groove to the eccentrics or cranks of the crank-shafts D and D′, by means of which eccentrics or crank this plate or mold ring G is raised or lowered to the extent of the throw of such eccentrics or cranks.

When operating my improved machine, the press-lever W is moved forward, the cross-head U′ of the press elevating the lever C′, which in turn imparts motion to the eccentric-shafts D and D′ and also to the cranks $d'$ $d'$ $d'$ $d'$, and thence to the links E E and also to the ring G, which is securely held upon the mold by means of the eccentric-axis having nearly reached a dead-center. When raising the lever W, the upper cross-head U′ allows the chain $C^2$ to slacken, and the lever C′ in turn elevates the plate or ring G by means of the eccentric-shafts D and D′, thus releasing the mold, which can be withdrawn and emptied.

Having described my invention, that which I consider as new, and desire to secure by Letters Patent, is—

1. In combination with a glass-press, a frame F, secured to the standards of the same and provided with lugs or bearings for supporting eccentric-shafts and their levers on opposite ends of said shafts, and links for connecting said levers in a manner to allow the cranks to move uniformly and simultaneously, substantially as shown and described.

2. In a glass-press, a pair of crank-shafts journaled in a frame attached rigidly to the press-standards, links connecting said crank-shafts to insure simultaneous and uniform action of both crank-shafts, and connections between said shaft and the cross-head of the glass-press for operating the same.

3. In a glass-press, a vertically-movable horizontal plate or ring, eccentrics or cranks movable simultaneously to or nearly to their utmost throw for forcing said plate or ring upon a glass-mold, thereby presenting the plate upon the mold when placed below such plate without any intermediate yielding connections, and means, substantially as described, adapted to turn the crank-shafts uniformly and simultaneously from the cross-head of the press, thereby holding or releasing the glass-mold.

4. In a glass-press, the combination, with the press-standards, of a frame rigidly attached thereto, crank-shafts journaled in said frame and provided with eccentrics or cranks, and a vertically-movable horizontal plate operated by said crank-shafts without any intermediate yielding connections.

5. In a glass-press, the combination, with the press-standards, of a frame rigidly attached thereto, crank-shafts journaled in said frame and provided with eccentrics or cranks, links connecting said cranks, and a vertically-movable horizontal plate adapted to bear upon a glass-mold and provided with lugs or prolongations movable vertically in guides and connected to said crank-shafts.

In testimony that I claim the foregoing I hereunto affix my signature, this 2d day of April, A. D. 1891.

JACOB ADOLF WIDMER. [L. S.]

In presence of—
 CHARLES LARGE,
 M. E. HARRISON.